THERMOELECTRIC REFRIGERATION CONTROL MEANS
Filed Feb. 18, 1965
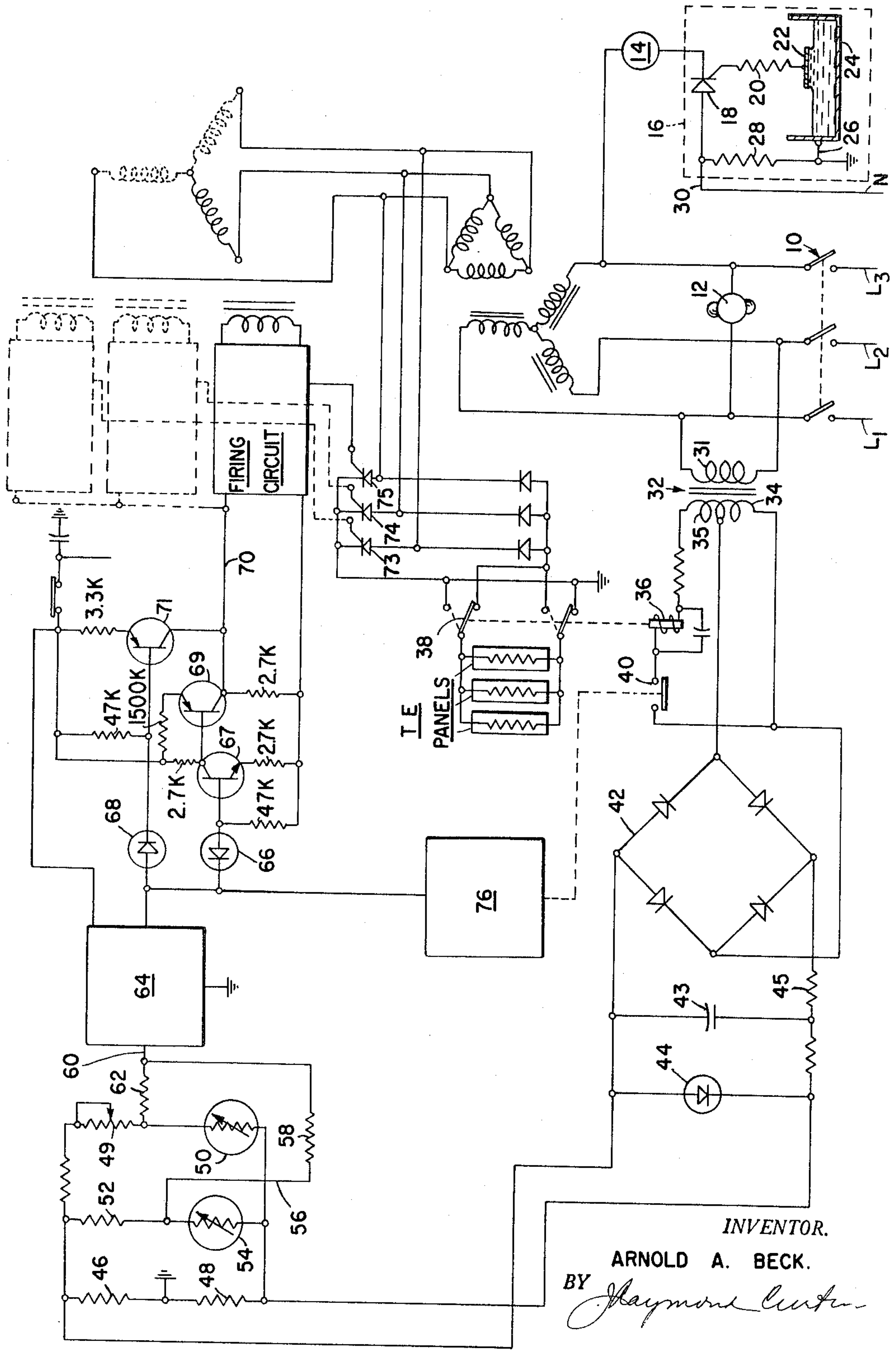
INVENTOR.
ARNOLD A. BECK
BY Raymond Curtin
ATTORNEY.

United States Patent Office 3,304,726

Patented Feb. 21, 1967

3,304,726
THERMOELECTRIC REFRIGERATION CONTROL MEANS

Arnold A. Beck, Syracuse, N.Y., assignor to Carrier Corporation, Syracuse, N.Y., a corporation of Delaware Filed Feb. 18, 1965, Ser. No. 433,737
2 Claims. (Cl. 62—3)

This invention relates to refrigeration control means. More specifically, this invention relates to an arrangement for controlling the operation of a thermoelectric refrigeration unit employed as a heat pump.

Thermoelectric refrigeration units operable under the well-known Peltier cycle have been proposed for the purpose of heating or cooling air supplied to an enclosure. Specifically, a thermoelectric panel having cold junctions on one side and hot junctions on the other is incorporated in equipment used to supply air to an enclosure through a ceiling therein. Attention is directed to co-pending United States patent application Serial No. 426,846, filed January 21, 1965 in the names of Gerald K. Gable et al. now issued as Letters Patent 3,426,477 and assigned to the assignee of this invention for an example of such equipment. In thermoelectric panels of the kind under consideration the specific junctions referred to above become cold and hot in response to the application of a D.-C. current having a particular polarity. When the polarity of the D.-C. current is reversed, the thermal characteristic of the junctions is reversed so that the cold junctions become hot junctions and vice versa.

This invention has for its principal object the provision of an improved control circuit employed with thermoelectric refrigeration units wherein the unit is employed to either heat or cool air being supplied to an enclosure.

An additional object of the invention is the provision of a control arrangement of the kind described wherein a first thermal sensing element is employed to detect the temperature of the air within a room and a second thermal sensing element is employed to detect the temperature of the air flowing from the air conditioning unit employing a thermoelectric refrigeration unit. The purpose of the two thermal sensing elements is to stabilize the control and prevent excessive cycling thereof. In this regard, a signal reflecting the temperature of the air flowing from the unit is employed to provide anticipation to the signal reflecting the temperature of the air in the enclosure so as to avoid overcooling or overheating the air in the enclosure.

A further object of the invention is the provision of an improved control circuit wherein novel means are employed for the purpose of operating a pump for removing condensate that collects in the air conditioning unit as the temperature of the air passed over the cold junctions is reduced below its dew point.

Other objects and features of the invention will be apparent upon a consideration of the ensuing specification and drawing in which the figure is a control arrangement illustrating the invention.

Briefly, the control forming the subject of the invention includes a thermal detection unit, an amplifier, a firing circuit for energizing silicon rectifier units employed for the purpose of supplying D.-C. current to the panel or panels. In addition, there is a conventional trigger circuit employed for the purpose of determining the polarity of the current supplied to the silicon rectifiers and thus the thermal characteristic of the junctions on the panel over which air is delivered. With this latter unit, the thermoelectric panel employed may be utilized to either heat or cool air flowing thereover under the influence of a fan in a conventional thermoelectric air conditioning unit.

As pointed out above an air conditioning unit incorporating a thermoelectric panel composed of P-type and N-type modules is illustrated in co-pending United States patent application Serial No. 426,846, filed January 21, 1965, now issued as Letters Patent 3,426,477 and assigned to the assignee of this invention. The control which is the subject of this invention may be employed to regulate operation of the air conditioning unit described in this co-pending application. The control system serving as the subject of this invention is automatically operable to regulate the output of the thermoelectric air conditioning unit to supply either cool air or warm air to an enclosure.

For a clear understanding of the invention, attention is directed to the drawing wherein there is shown schematically a circuit diagram wherein a convenient source of A.-C. current is represented by lines $L_1$, $L_2$ and $L_3$ including a main control switch 10. Connected across two of the power supply lines is a fan 12 employed for the purpose of routing air to be supplied to the enclosure over the thermoelectric panel. Also connected across the power supply line and an active neutral line is a condensate pump motor 14 together with a circuit 16 for energizing the condensate pump motor. Circuit 16 includes a silicon rectifier 18, the gate of which is connected to a resistance 20. To the end of resistance 20 is connected a flat copper member 22 suspended within a condensate trough 24 formed of material having good electrical conducting properties. Connected to the condensate trough 24 is lead 26 connected in turn to a resistance 28. Condensate pump motor 14 is energized when the level of condensate in trough 24 collects to a point where engagement between the pool of liquid and the member 22 occurs. Current flows from line 30 through resistance 28, lead 26, pan 24, the pool of water within the pan, member 22 and resistance 20 to fire the silicon rectifier 18. Current thus flows to the motor 14 to complete a circuit therethrough. An important feature of the invention includes the utilization of a relatively flat bar 22 providing a substantial surface to which the liquid or condensate in trough 24 may cling, even after the level of condensate has dropped below the plate. In other words, the meniscus effect of the liquid permits the circuit to be established through the pool of liquid even though the liquid level is below the member or bar 22.

It will be observed that the primary coil 31 of transformer 32 is connected across two of the lines serving as the power source. The secondary coil includes a first portion 34 and a second portion 35. Portion 34 provides a ten-volt source of power for transmission to the thermal sensing device employed in the invention. The two portions 34 and 35 serve as a source of power for a circuit including a relay 36 controlling a switch 38 regulating polarity of the current supplied to the silicon rectifiers associated with the individual thermoelectric panels. Contacts 40 are connected in series with relay 36 and are controlled by a trigger circuit to be later described. The output from secondary coil 34 is fed to a bridge 42 where it is converted to D.-C. The current flowing from the rectifier is then passed through a condenser 43 and resistor 45 acting as a filter, and is then fed to a zener diode voltage regulator 44 where it emerges as a D.-C. source of 6.8 volts to be fed to a bridge circuit including two thermal detection devices.

Considering the bridge circuit, resistances 46 and 48 form one leg of the bridge. A second leg includes the variable resistor 49 and a temperature sensing device 50, preferably an NTC thermistor, the resistance of which varies with respect to a change in temperature. The thermistor 50 is employed to sense the temperature of the air flowing within the enclosure being served by the thermoelectric unit. Imposed across the bridge so as to serve as a part thereof is a resistance 52 and a second thermistor 54, also the NTC type, responsive to the temperature of the air flowing from the thermoelectric unit adjacent the discharge of air flow therefrom. The output of that portion of the bridge including members 46, 48, 52 and 54 is fed through a lead 56 through a resistor 58 to a lead 60. The output of the bridge circuit including resistors 46, 48, 49 and thermistor 50 is fed through a relatively small resistance 62 to the lead 60. The action of the thermistors is such that the effect of the signal in line 60 represents the temperature sensed by both thermistors 50 and 54. Should the output be zero, no signal will be passed to the amplifier and the control will remain as set. Should thermistor 50 sense a need for cooling in the area served, a signal will be fed through resistance 62 to lead 60 and will be represented by a voltage of a certain value. As the thermoelectric unit acts to satisfy the cooling demand, thermistor 54 will detect the relatively cold temperature flowing from the unit to the room and will send a signal to lead 60 via lead 56 and resistance 58. The resultant of the signals as obtained in accordance with known network theory presents to an amplifier of a conventional construction indicated at 64 a new signal which will tend to reduce the magnitude of the original signal.

An important feature of the invention is the design of the bridge circuit forming the thermal detection means. It will be appreciated that normally it will require the passage of a predetermined time interval before the temperature sensing device serving the enclosure is satisfied. The time interval is determined, in part, by the size of the enclosure and the capacity of the fan. Although the temperature sensing device, in this case thermistor 50, may be satisfied the unit will operate to overcool because of a natural lag in the apparatus. The bridge described will minimize the overcooling by anticipating satisfaction of the thermistor 50. To this end, resistance 58 possesses a relatively high resistance compared to resistance 62. Thus, the value of the signal at the output of the thermal sensing bridge as detected in lead 60 represents the requirement of the thermistor 50 adjusted to reflect the action of thermistor 54 directly sensing the output of the thermoelectric air conditioning unit.

The voltage of the signal in lead 60 reflects the requirement for either heating or cooling. As pointed out above, should the bridge circuit described be balanced the control circuit is designed so that the amplifier 64, being biased at 8.5 volts, will not transmit a signal to the firing circuit actuating mechanism comprising zener diodes 66 and 68 together with circuitry for assuring transmission of a constant phase signal through lead 70 to the firing circuit for energizing the silicon rectifiers 73, 74, 75 controlling flow of current to the panels served thereby.

In the event the signal emanating from the amplifier is more than 8.5 volts flow of current through zener diode 66 only will ensue. A signal representing the magnitude of the cooling requirement will be present in lead 70 causing the individual firing circuits associated with the silicon rectifiers 73, 74 and 75 to be energized. Switch 38 will be in the cooling position so that the polarity of the current flowing to the panels will be such that the junctions in communication with the flow of air under the influence of fan 12 will be cold.

The control automatically modulates the cooling output of the panels as it approaches the design set point by detecting through thermistor 50 a decrease in the temperatuer of the air as the unit operates. At the same time the action of thermisor 54 is such that it expedites satisfaction of the thermal requirement of the enclosure by introducing into the control compensation for the lag in time for a change in output from the air conditioning unit to be sensed by the thermistor 50. Operation under circumstances where a heating requirement is involved is similar to that described in conjunction with the cooling requirement with the exception that the Schmitt trigger circuit 76, as it senses an amplifier output voltage less than 8.5 volts, will actuate the switch controlling contacts 40 to move relay 38 to the dotted line position indicated. Under these circumstances, the polarity of the current flowing through the panels will be such that the junctions on the panel in communication with air flow will be hot. It will also be appreciated that zener diode 68 will pass current while zener diode 66 will not. It will be obvious to those skilled in the art that transistors 67, 69 and 71 are employed to assure the presence in lead 70 of a signal having a constant phase characteristic.

While I have described a preferred embodiment of the invention, it will be understood the invention is not limited thereto since it may be otherwise embodied within the scope of the following claims.

I claim:

1. A control for an air conditioning unit including thermoelectric panel means by said control regulating the electric current supplied to the panel means, comprising a source of electrical energy, a bridge circuit connected to said source of electrical energy, said circuit including a leg including means sensing the temperature of the air in the enclosure served by said unit, a leg including means sensing the temperature of the air flowing from the unit to the enclosure to produce a resultant compensated electrical signal indicative of a heating or cooling requirement, silicon rectifier means associated with said thermoelectric panel means for regulating supply of current to the panel means, means responsive to the signal generated by said bridge circuit for firing said silicon rectifier means.

2. Bridge circuit means for use with apparatus employed to heat or cool air within an enclosure comprising one portion including a temperature sensing device, the resistance of which changes with a variation in temperature, said temperature sensing device measuring the temperature of the air within the enclosure; a second portion including a temperature sensing device, the resistance of which changes with a variation in temperature, said temperature sensing device measuring the temperature of air flowing from the apparatus, resistance means in series with the output of said first portion and resistance means in series with the output of said second portion, said second resistance being greater in magnitude than said first resistance so as to produce a resultant output responsive to the thermal requirement of the enclosure as adjusted to reflect the lag in time due to the detection of a change in output of the apparatus by the temperature sensing device associated with the air in the enclosure.

References Cited by the Examiner

UNITED STATES PATENTS

| | | | |
|---|---|---|---|
| 2,888,945 | 6/1959 | Marlow | 137—392 |
| 2,904,063 | 9/1959 | Wall | 137—392 |
| 2,954,530 | 9/1960 | Haskell | 330—19 |
| 2,998,707 | 9/1961 | Meess | 62—3 |
| 3,040,157 | 6/1962 | Hukee | 219—20 |
| 3,050,257 | 8/1962 | Sweger | 236—74 |
| 3,074,410 | 1/1963 | Foster | 128—400 |
| 3,085,405 | 4/1963 | Frantti | 62—3 |

WILLIAM J. WYE, *Primary Examiner.*